Nov. 10, 1953

J. J. GREVICH 2,658,552

POWER HAND BAND SEALER

Filed March 29, 1952

INVENTOR
John J. Grevich

BY Robert M. Dunning

ATTORNEY

Nov. 10, 1953     J. J. GREVICH     2,658,552
POWER HAND BAND SEALER

Filed March 29, 1952     3 Sheets-Sheet 2

INVENTOR
John J. Grevich
BY Robert M. Dunning
ATTORNEY

Nov. 10, 1953 J. J. GREVICH 2,658,552
POWER HAND BAND SEALER
Filed March 29, 1952 3 Sheets-Sheet 3
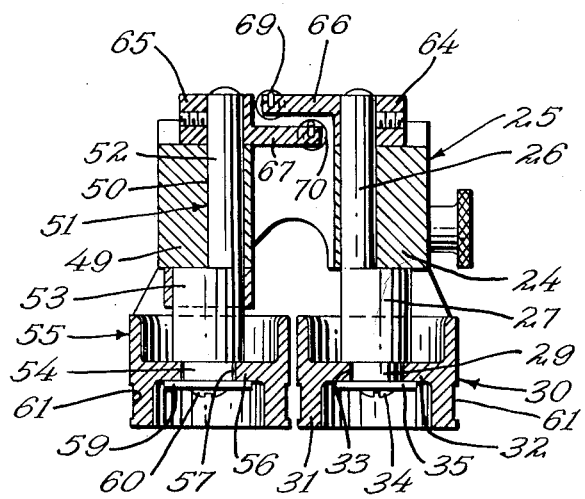
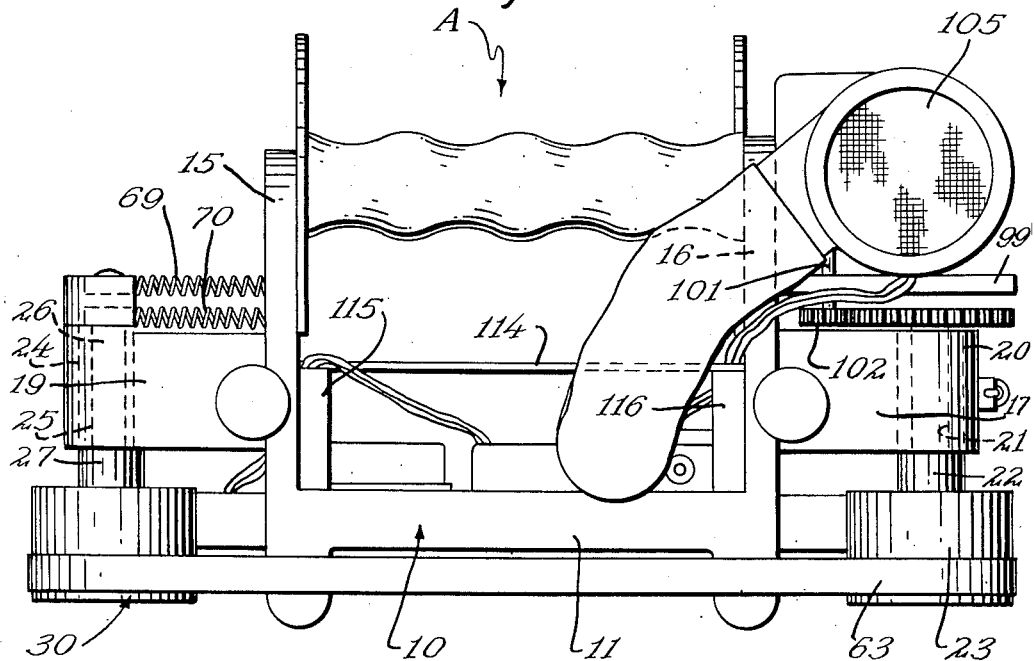
INVENTOR
John J. Grevich
BY Robert M. Dunning
ATTORNEY

Patented Nov. 10, 1953

2,658,552

UNITED STATES PATENT OFFICE 2,658,552

POWER HAND BAND SEALER

John J. Grevich, New Richmond, Wis., assignor to Doughboy Industries, Inc., New Richmond, Wis., a corporation of Wisconsin Application March 29, 1952, Serial No. 279,389

8 Claims. (Cl. 154—42)

This invention relates to an improvement in power hand band sealer and deals particularly with a power driven portable sealing unit which may be used to seal films of plastic of a type which must be sealed between a small range of sealing temperatures.

Certain films usually of the transparent or translucent type may be sealed together under a relatively wide range of sealing temperatures. As a result little difficulty is experienced in sealing two films together. However, other films such as that known as polythene, Pliofilm, and poly vinyl chlorides are extremely critical in their sealing temperatures. These films melt when a high temperature is employed and do not seal effectively when a low temperature is applied. The present device is particularly useful in sealing films of this type.

An object of the present invention resides in the provision of a portable motor driven sealing unit which supports a pair of endless bands in substantial surface contact so that the films to be sealed may move between the bands and in unison therewith. These bands are moved in unison to hold the films being sealed therebetween and travel at a uniform speed so that the time of contact between the films being sealed and the band is substantially constant. The bands are heated through contact with a heated shoe. The heated shoe engages the inner surface of each band while the films being sealed are positioned between the outer surfaces of the band. Thus the heat for the sealing operation is transmitted through the band.

A feature of the present invention lies in the provision of a portable motor driven sealing unit including a pair of bands of thin metal or other heat conductive material and in applying heat to the bands for transfer to the films being sealed. Thus the films do not directly contact the heating shoe, permitting a more gradual heating operation.

A feature of the present invention resides in the provision of a portable heat sealing unit which incorporates heating shoes and also cooling shoes. The bands between which the films to be sealed are supported are moved at a uniform speed across the heating shoe to be heated thereby and next across the cooling shoes to be cooled thereby. As a result the film to be sealed is quickly sealed and quickly cooled to prevent excessive melting of the film and to produce a tight bond without destroying the continuity of the films.

A feature of the present invention resides in the provision of a heat sealing unit including a pair of heat conductive bands between which the films are inserted and in providing heating shoes which engage a relatively narrow portion of the band. The heat is conducted into the band in such a way that the heat tends to spread toward the edges of the band, thus preventing any portion of the band from being overheated. The heated shoe engages the band intermediate its side edges and the heat tends to spread toward the relatively cooler edges, thus enabling the heat to be more readily controlled.

A further feature of the present invention resides in the provision of cooling shoes which contact the band after the heating operation. The cooling shoes are preferably cooled by the passage of air through the shoes. Thus the motor which actuates the sealing unit also serves to provide a draft of cool air through the shoes which tends to remove heat conducted thereto from the sealing bands and to thus cool the area of the films which have been sealed.

A further feature of the present invention resides in the provision of a simple support by means of which the sealer may be held in any desired adjusted position for the sealing operation.

These and other objects and novel features of my invention will be more clearly and fully set forth in the following specification and claims.

In the drawings forming a part of my specification:

Figure 4 is a sectional view through the sealing unit, the position of the section being indicated by the line 4—4 of Figure 2.

Figure 5 is a cross-sectional view on the line 5—5 of Figure 2.

Figure 6 is a side elevational view of the entire unit.

Figure 1:
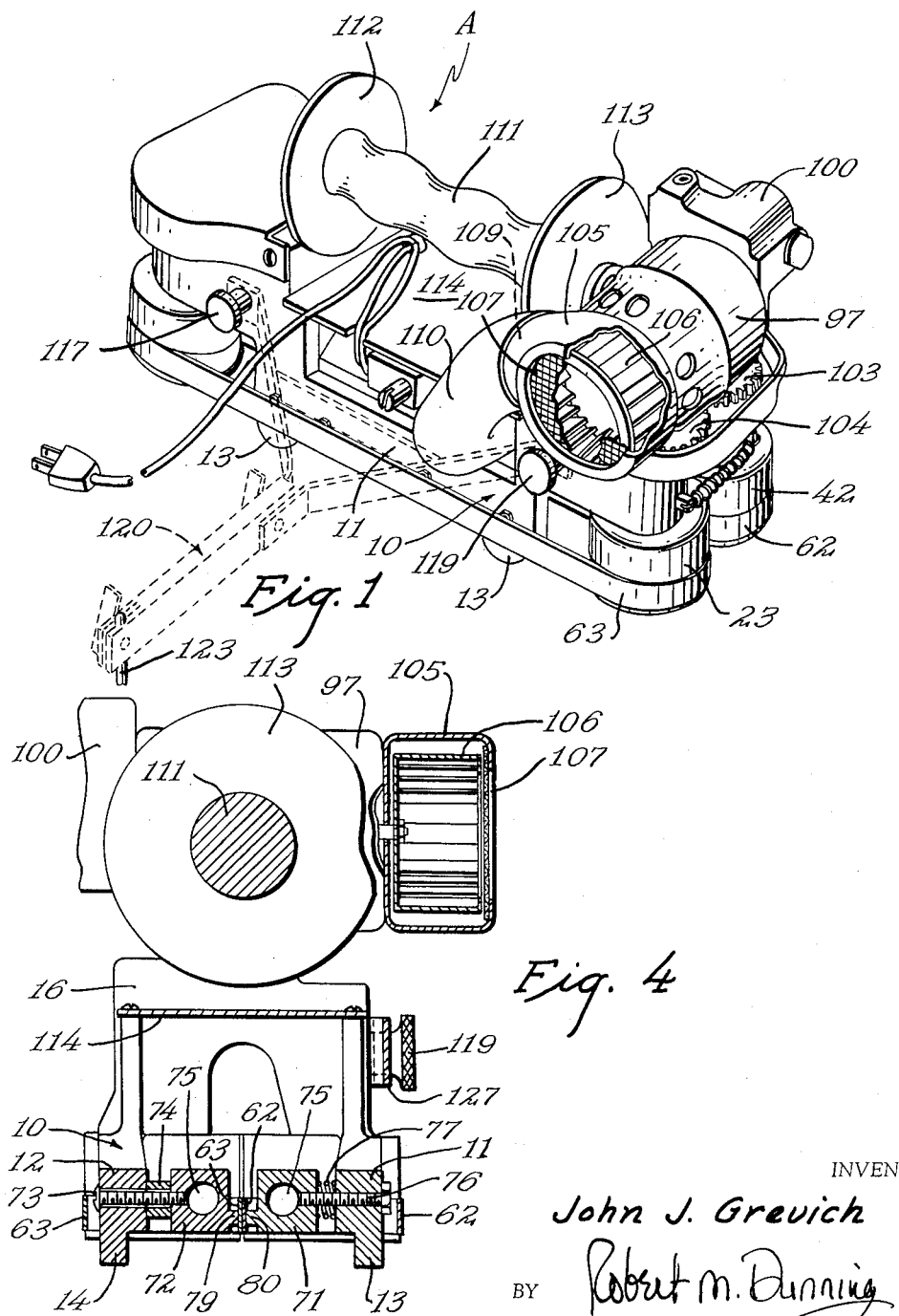
Figure 1 is a perspective view of the power driven band sealer showing the general arrangement of the parts.

The heat sealing unit is indicated in general by the letter A and is best illustrated in general in Figures 1 and 6 of the drawings. The unit includes a frame indicated in general by the numeral 10. The frame 10 includes spaced sides 11 and 12 which extend longitudinally of the unit body. Rounded legs 13 project downwardly from the side 11 and similar legs 14 project downwardly from the side 12. The legs 13 and 14 are designed to support the unit on a flat surface with the heating shoes out of contact with the surface.

The sides 11 and 12 are connected at longitudinally spaced points by cross members 15 and 16 which form spaced parallel walls. An arm 17 projects longitudinally from the cross member 16 and a similar arm 19 projects from the cross member 15 in alignment with the arm 17. The arm 17 supports a vertical bearing 20 through which a vertical shaft 21 extends. The shaft 21 is provided with a large diameter portion 22 beneath the bearing 20, the difference in diameter of the two shaft portions providing a shoulder which limits the upward movement of the shaft in the bearing. A roller 23 is supported on the lower end of the shaft 21.

The arm 19 is provided with a bearing 24 extending therethrough for accommodation of an eccentric 25. The eccentric 25 is provided with a small diameter upper portion 26 which is accommodated in the bearing 24 and a larger diameter lower portion 27 which is arranged on an axis parallel to, but offset from the axis of the upper portion 26. The two diameter portions form a shoulder therebetween which may abut against the lower end of the bearing 24 to limit upward movement of the eccentric. A smaller diameter portion 29 axially aligned with the lower portion 27 of the eccentric forms the lower extremity of the eccentric. A roller 30 is mounted at the lower end of the eccentric. The roller 30 includes an outer peripheral shell 31 and a web 32 between the upper and lower extremities of the shell. An aperture 33 is provided in the web 32 through which the eccentric extremity 29 extends. A screw 34 is threaded into the lower end of the extremity to hold the roller in place thereupon. The screw 34 supports a washer 35 beneath the web 32 the eccentric portion 29 being of sufficient length to permit the roller to rotate freely thereabout. The roller 23, while not shown in section, is constructed similar to the roller 30.

Figures 2, 3:
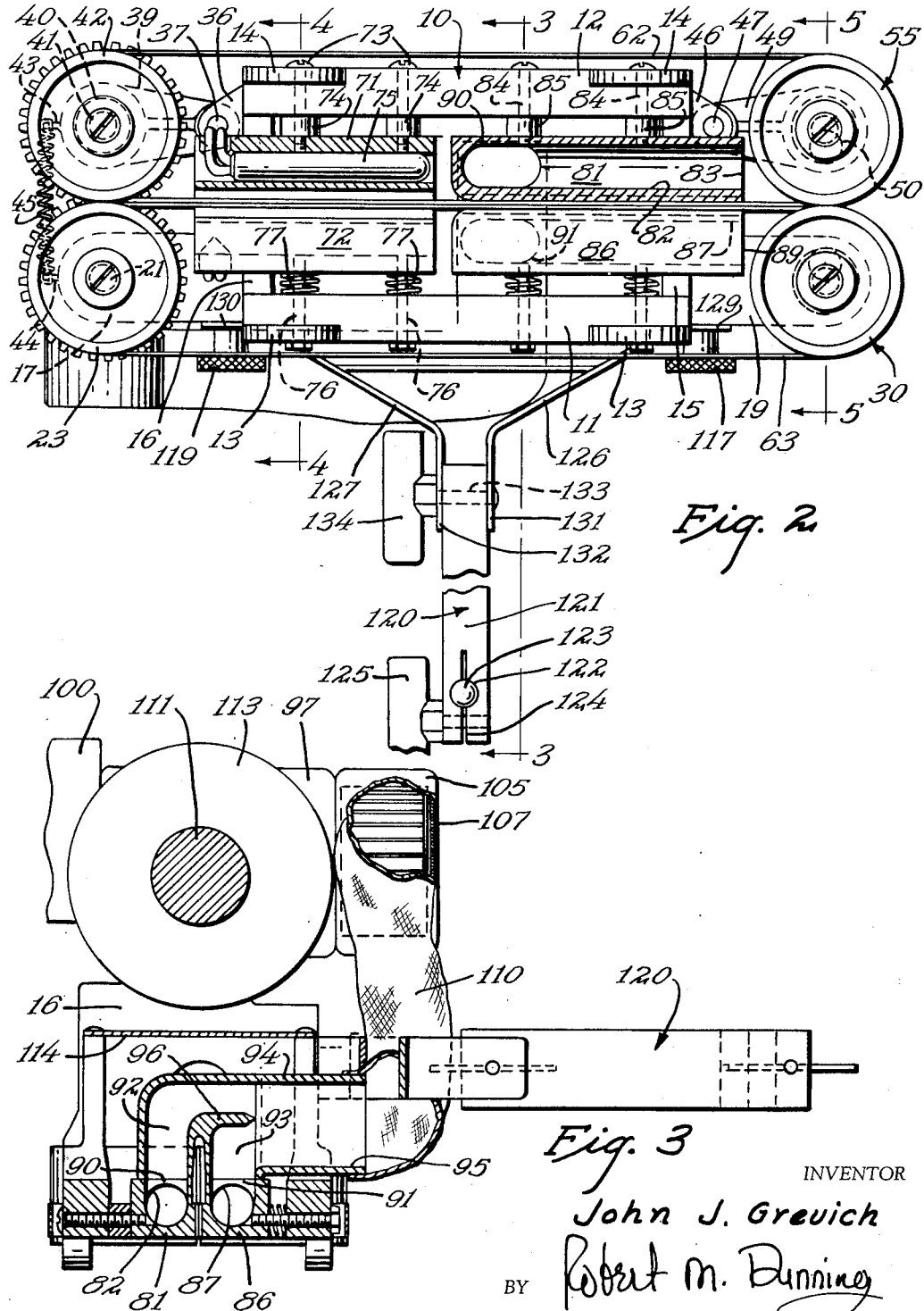
Figure 2 is a bottom plan view of the sealing unit, a portion thereof being broken away to show the construction thereof.
Figure 3 is a sectional view through the unit, the position of the section being indicated by the line 3—3 of Figure 2.

A pair of vertically spaced ears, the lower of which is illustrated in Figure 2 of the drawings, are indicated at 36 projecting longitudinally from the cross member 16. These ears 36 are apertured to support a pivot 37. The pivot 37 pivotally connects the ears 36 to an arm 39. The arm 39 supports a bearing 40, which supports a vertical shaft 41. The shaft 41 is provided with a larger diameter lower portion similar to the portion 22 of the shaft 31 and acts to support a roller 42 which is similar to the roller 23. A lug 43 projects longitudinally from the arm 39 and a similar lug 44 projects from the fixed arm 17. A spring 45 connects the lugs 43 and 44 and tends to hold them in surface contact.

A pair of vertically spaced lugs 46, one of which is illustrated in Figure 2 of the drawings, project longitudinally from the cross member 15. The lugs 46 are apertured to support a pivot 47. The pivot 47 connects the lugs 46 to an arm 49. The arm 49 is provided with a bearing aperture 50 extending vertically therethrough to accommodate an eccentric 51, best illustrated in Figure 5 of the drawings. As indicated in Figure 5 the eccentric 51 includes a small diameter upper portion 52 which extends through the bearing aperture 50 and a larger diameter portion 53 below the upper portion 52. The larger diameter lower portion 53 engages beneath the arm 49 to limit upward movement of the eccentric. The eccentric portion 53 is arranged on an axis parallel to the axis of the upper portion 52 but off-set therefrom. A smaller diameter lower extremity 54 is concentric with the portion 53.

A roller 55 similar to the roller 30 is provided with a web 56 having an aperture 57 therethrough to accommodate the eccentric portion 54. A washer 59 is held in place on the eccentric by a screw 60. The dimensions of the eccentric portion 54 are such as to permit the roller 55 to rotate freely about the portion 54.

Each of the rollers 23, 30, 42 and 55 are externally grooved as indicated at 61 at a point spaced from the lower extremity thereof. The rollers support a pair of endless bands 62 and 63, one band 62 extending between the rollers 55 and 42 and the other band 63 extending between the rollers 23 and 30. As indicated in Figures 5 and 6 of the drawings, each of the eccentrics 25 and 51 are provided with a collar at its upper extremity, the collar on the eccentric 25 being indicated at 64 and the collar of eccentric 51 being indicated at 65. The collars 64 and 65 are provided with radially extending arms 66 and 67 respectively. The arms are connected to the cross member 15 of the frame by springs 69 and 70 respectively. The springs 69 and 70 tend to rotate the eccentrics 25 and 51 in opposite rotative directions. The eccentrics are so arranged that the springs tend to tighten the bands 62 and 63 and also to urge the rollers 30 and 55 into surface contact.

A pair of heating shoes 71 and 72 are supported by the frame members 11 and 12 respectively. A pair of bolts or machine screws 73 extend through the frame member 12 and through spacing collars 74 and into the outer side of the heating shoe 71. The shoe 71 is provided with a longitudinal aperture extending therethrough designed to accommodate a heating element 75. The heating element, when energized, generates heat which in turn heats the shoe 71.

The shoe 72 is somewhat similarly constructed. Bolts 76 extend through the frame side 11 and are threaded into the side of the heating shoe 72 to support the same. Springs 77 encircle the bolts 76 and are interposed between the frame side 11 and the shoe 72 to urge this shoe into contacting relation with the bands. Thus the springs 77 urge the bands together and urge the bands against their respective heating shoes. At the same time, the springs permit separation of the bands and heating shoes to accommodate a web or plurality of webs therebetween.

As indicated in Figure 4 of the drawings, the heating shoes are generally rectangular in cross section and are provided with longitudinally extending rib in surface contact with each band. The heating shoe 72 is provided with a rib 79 which engages the inner surface of the band 63 while the shoe 71 is provided with an opposed rib 80 which engages the inner surface of the band 62. It will be noted that the ribs 79 and 80 engage against the bands intermediate their upper and lower edges so that the heat conducted to the bands from these ribs may spread toward the edges of the band as the band travels along the length of the heating shoes.

A pair of cooling shoes are supported between the frame sides in longitudinal alignment with the heating shoes 71 and 72. The cooling shoe 81 comprises an elongated body which is generally rectangular in cross section and which is provided with a passage 82 therein which communicates with the end 83 of the shoe. Mounting bolts 84 extend through the side 12 and through spacers 85 and are anchored in the wall of the shoe 81 to support the same with the innermost wall in surface contact with the band 82.

The cooling shoe 86 is similar to the shoe 81 and includes a passage 87 which extends longitudinally of the shoe and in communication with the end 89 thereof. Both of the shoes 81 and 86 are provided with upwardly directed apertures 90 and 91 respectively at the closed end of the shoe. These apertures 90 and 91 communicate with downwardly directed passages 92 and 93 of a manifold 94. The manifold 94 has a laterally extending inlet 95 and a partition wall 96 that divides the manifold into the adjoining passages 92 and 93.

The heat sealing unit is actuated by a motor 97 supported upon a platform 99 projecting longitudinally from the cross member 16 as indicated in Figure 6. The motor 97 is provided with a gear reducing unit 100 at one end thereof which rotates a vertical shaft 101 extending downwardly from the gear unit and visible in Figure 6 of the drawings. The shaft 101 drives a drive pinion 102 which is in mesh with a gear 103 on the vertical shaft 41. A gear 104 is mounted on the parallel shaft 21 and is in mesh with the gear 103. The teeth of the gears 103 and 104 are sufficiently long to permit the shafts 41 and 21 to move closer or farther apart so as to permit separation of the rollers 23 and 42. Thus the gears 103 and 104 remain in mesh even when the article being sealed extends between the bands 62 and 63 to separate the rollers.

A fan housing 105 is supported on the end of the motor 97 and includes a rotor 106 having a series of angularly spaced blades which are capable of moving air. The end of the fan casing is open as indicated at 107 so that the air may enter the casing and be forced by the rotor blades through the tangentially extending outlet 109. The outlet 109 is connected to the inlet 95 of the cooling air manifold by a flexible tube 110. The flexible tube 110 may be of fabric or plastic and acts to convey the air from the outlet of the blower to the inlet of the cooling shoes.

A handle 111 is supported between the cross members 15 and 16 so that the sealing unit may be moved about. Guard discs 112 and 113 are provided at opposite ends of the handle 111 so as to prevent contact between the hands and the metal portions of the frame which eventually become heated to some extent by proximity with the heating shoes. A platform 114 of insulating material also extends between the cross members 15 and 16 and is supported by spacing lugs 115 and 116. The necessary control elements are supported beneath the platform 115, such as the thermostat for controlling the heat of the shoes, the heat adjusting rheostat for regulating the heat, and any other such elements as the circuit switch. A pair of thumb screws 117 and 119 extend into the frame sides on opposite sides of the center thereof. These thumb screws are designed to connect the frame to a suitable supporting bracket indicated in general by the numeral 120. The bracket 120 includes an elongated bar 121 having an aperture 122 therethrough near one end thereof designed to engage about a supporting rod 123. The end of the bar 121 is split as indicated at 124 and the split sides may be compressed together by a clamping nut 125.

A pair of angle bracket arms 127 and 126 have outer extremities 129 and 130 which are arranged in a common plane and are apertured or slotted to fit about the shanks of the thumb screws 117 and 119. The angle bracket arms 126 and 127 are provided with parallel ends 131 and 132 designed to extend on opposite sides of the bar 121. A clamping bolt 133 extends through the parallel arm ends 131 and 132 and through the bar 121 and a thumb nut 134 is threaded on the end of the bolt by means of which the shoes may be clamped in angularly adjusted relationship. The entire bracket 121 is thus detachably connected to the frame and when mounted upon the rod 123 will hold the sealing unit in any desired angular position.

The operation of the apparatus may be readily understood from the foregoing description. When the circuit is closed to the heating elements 75, the shoes 71 and 72 are quickly heated to the proper temperature. Thermostatic means are provided for controlling the temperature of these shoes.

When it is desired to seal a pair of films together, the films being of a type which must be sealed within a critical temperature range, the motor 97 is set into operation. The bands 62 and 63 are then moved along their endless path, the surfaces of the bands contacting between the heating shoes. The blower is also set into operation to force air through the cooling shoes 81 and 86.

The films to be sealed, such as the upper portion of a bag or the like, are inserted between the bands at the inlet end of the apparatus. The sealing unit may be supported by the bracket 120 in any suitable position, or the device may be held manually during the sealing operation. As the films move between the sealing bands 62 and 63, they pass between the relatively narrow flanges 79 and 80 of the heating shoes 72 and 71. Heat flows through the metallic bands in sufficient quantity to seal the films therebetween.

The temperature of the heating shoes, the width of contact between the heating shoes and the metal bands, and the speed of movement of the bands is synchronized so that the films may be heated to a sealing temperature during the passage of the films between the heating shoes. Immediately after being sealed the films pass between the cooling shoes 81 and 86. These shoes are cooler than the heated bands and act to conduct heat quickly away from the bands, thereby permitting the temperature of the sealed films to drop quickly. This prevents a tendency for the films to stick to the bands or to be destroyed by long engagement with the heated bands and permits a closer control of the heating period.

The rollers supporting the bands spread sufficiently to permit the films to pass between the bands, the heating shoes and cooling shoes also flex apart sufficiently to permit the passage of the films while still applying sufficient force thereto to thoroughly seal the films.

In accordance with the patent statutes, I have described the principles of construction and operation of my power hand band sealer, and while I have endeavored to set forth the best embodiment thereof, I desire to have it understood that obvious changes may be made within the scope of the following claims without departing from the spirit of my invention.

I claim:

1. A heat sealing apparatus for heat sealing films including a pair of opposed endless bands of heat conductive material, means supporting said bands for travel through respective closed circuits, said bands being disposed in face to face relation through a portion of their circuits, means for driving said bands at similar speeds, said bands being adapted to engage the films therebetween and carry the films through the face to face portion of said circuits, a pair of heating shoes between which the face to face portions of the bands extend, and a pair of cooling shoes between which the face to face portions of the shoes extend, said heating shoes and said cooling shoes engaging said tapes with a sliding engagement, and blower means connected to said cooling shoes to cool the same.

2. The structure described in claim 1, and in which the cooling shoes have air ducts extending therethrough, and including means connecting said blower means to said air ducts.

3. The structure described in claim 1 and in which the means for driving the bands and the blower means are provided with a common source of power.

4. A heat sealing apparatus for heat sealing thermoplastic films, including a pair of opposed endless bands of heat-conductive material, means supporting said bands for travel through respective closed circuits, said bands being disposed in face to face relation through a portion of said circuits, means for driving said bands at similar speeds, said bands being adapted to engage the films therebetween and carry the films through the face to face portion of said circuits, a pair of heating shoes between which the face to face portions of the bands extend and a pair of cooling shoes between which the face to face portions of the shoes extend, said heating shoes and said cooling shoes engaging said bands with a sliding engagement, said cooling shoes having air ducts extending therethrough, blower means, and means connecting said blower means to said air ducts to direct air therethrough.

5. The structure described in claim 4 and including a common manifold connected to said air ducts, said means connecting said blower to said air ducts being connected to said manifold.

6. The construction described in claim 4 and in which the connecting means connecting the blower and the air ducts comprises a flexible tube.

7. The construction described in claim 4 and in which the means connecting the blower and the air ducts comprises a flexible collapsible tube.

8. The construction described in claim 4 and including a motor connected to said means for driving the bands at similar speeds, said blower being connected to said motor for operation thereby.

JOHN J. GREVICH.

References Cited in the file of this patent

UNITED STATES PATENTS

| Number | Name | Date |
|---|---|---|
| 2,469,972 | Lowry et al. | May 10, 1949 |